(12) United States Patent
Gonzalez et al.

(10) Patent No.: US 6,370,927 B1
(45) Date of Patent: Apr. 16, 2002

(54) SECURITY DEVICE FOR SPARE WHEEL WINCH

(76) Inventors: Angel M. Gonzalez; Lisa Brendel, both of 1929 W. Potomac, Chicago, IL (US) 60622

( * ) Notice: Subject to any disclaimer, the term of this patent is extended or adjusted under 35 U.S.C. 154(b) by 0 days.

(21) Appl. No.: 09/607,451

(22) Filed: Jun. 30, 2000

(51) Int. Cl.[7] ............................................... E05B 65/12
(52) U.S. Cl. ............................ 70/259; 70/258; 70/260
(58) Field of Search ........................... 70/258, 259, 260

(56) References Cited

U.S. PATENT DOCUMENTS

| | | | | |
|---|---|---|---|---|
| 3,599,455 A | * | 8/1971 | Pilvet | 70/123 |
| 4,526,021 A | | 7/1985 | Princell | 70/183 |
| 4,988,023 A | * | 1/1991 | Heathcoat | 224/42.21 |
| 5,199,287 A | | 4/1993 | Mcclary | 70/259 |
| 5,211,043 A | * | 5/1993 | Langdon | 70/259 |
| 5,330,313 A | | 7/1994 | Easterwood | 414/463 |
| 5,582,048 A | | 12/1996 | Schotthoefer | 70/259 |
| 5,758,523 A | | 6/1998 | Kozlowski, Jr. et al. | 70/259 |
| D405,744 S | | 2/1999 | Young et al. | D12/162 |
| 6,213,361 B1 | * | 4/2001 | Dexel | 224/42.24 |

* cited by examiner

*Primary Examiner*—William A. Cuchlinski, Jr.
*Assistant Examiner*—Marthe Y. Marc-Coleman

(57) ABSTRACT

A security device for spare wheel winch for preventing the spare wheel winch from being lowered beneath the vehicle. The security device for spare wheel winch includes a tubular member having a first open end and a second open end and also having a bore extending therethrough and further having a bracket-like portion disposed at the first end thereof; and also includes a locking assembly for preventing the spare wheel winch from being lowered.

13 Claims, 4 Drawing Sheets

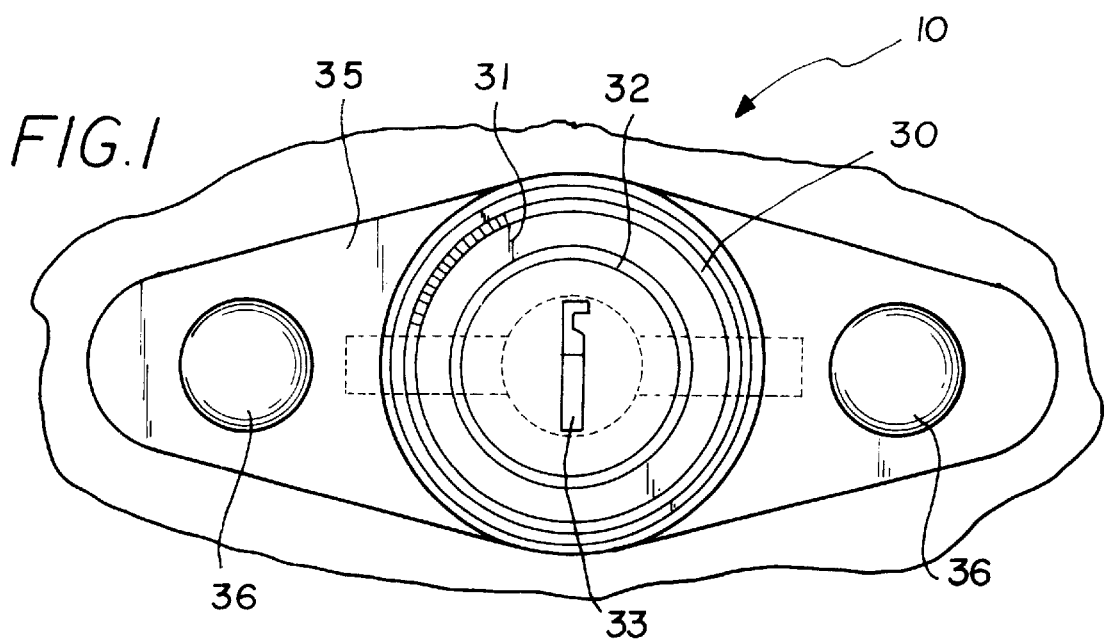
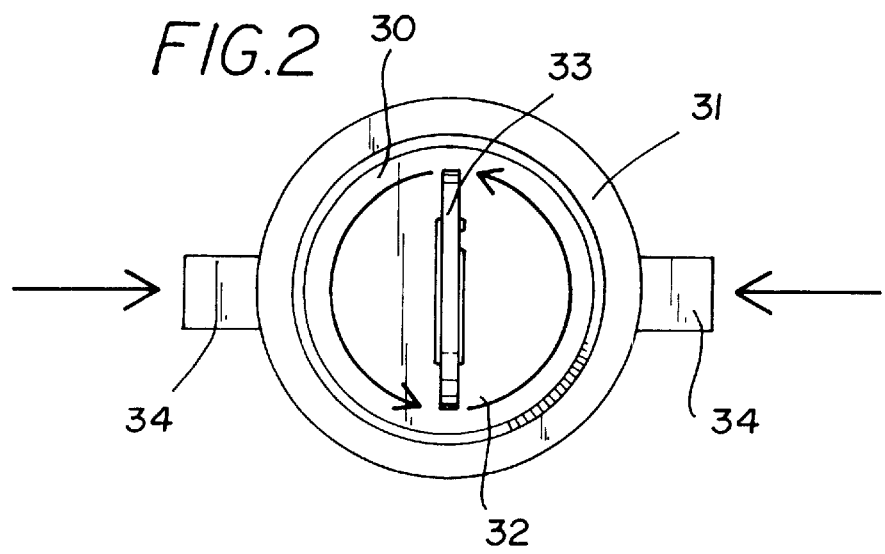

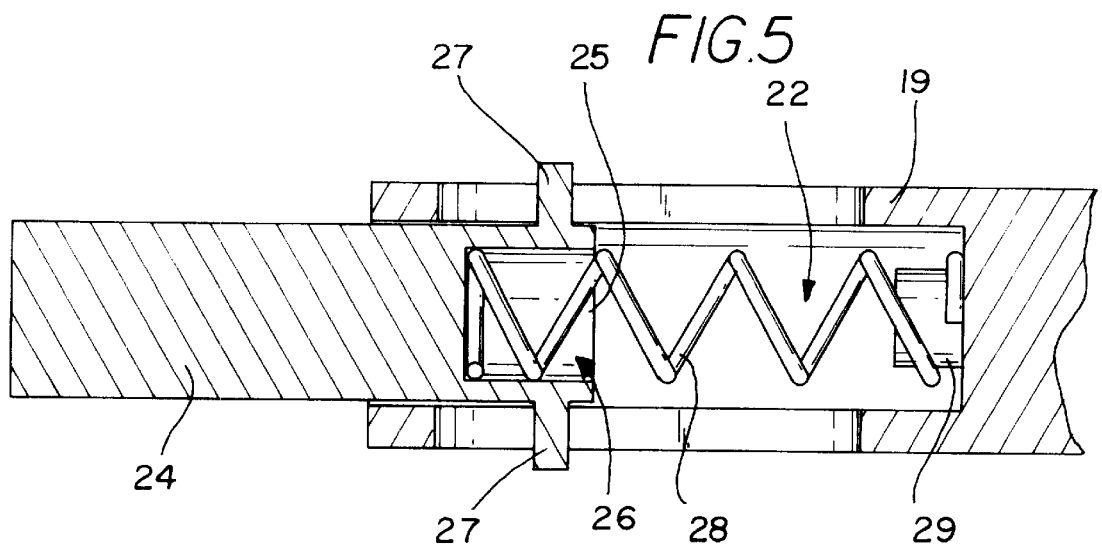
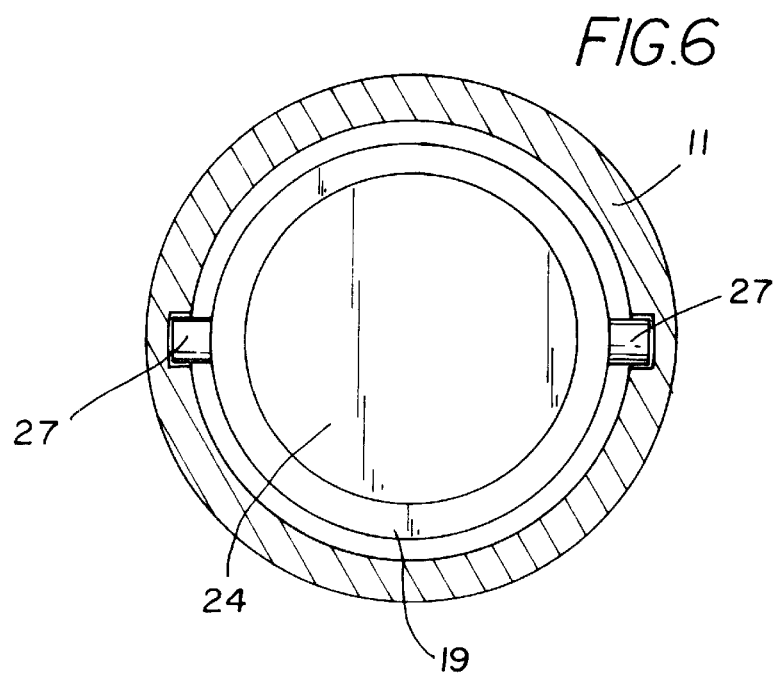

SECURITY DEVICE FOR SPARE WHEEL WINCH

BACKGROUND OF THE INVENTION

1. Field of the Invention

The present invention relates to a spring-loaded and locking spare tire enforcer and more particularly pertains to a new security device for spare wheel winch for preventing the spare wheel winch from being lowered beneath the vehicle.

2. Description of the Prior Art

The use of a spring-loaded and locking spare tire enforcer is known in the prior art. More specifically, a spring-loaded and locking spare tire enforcer heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,758,523; U.S. Pat. No. 5,582,048; U.S. Pat. No. 5,199,287; U.S. Pat. No. 4,526,021; U.S. Pat. No. 5,330,313; and U.S. Pat. No. Des. 405,744.

While these devices fulfill their respective, particular objectives and requirements, the aforementioned patents do not disclose a new security device for spare wheel winch. The inventive device includes a tubular member having a first open end and a second open end and also having a bore extending therethrough and further having a bracket-like portion disposed at the first end thereof; and also includes a locking assembly for preventing the spare wheel winch from being lowered.

In these respects, the security device for spare wheel winch according to the present invention substantially departs from the conventional concepts and designs of the prior art, and in so doing provides an apparatus primarily developed for the purpose of preventing the spare wheel winch from being lowered beneath the vehicle.

SUMMARY OF THE INVENTION

In view of the foregoing disadvantages inherent in the known types of spring-loaded and locking spare tire enforcer now present in the prior art, the present invention provides a new security device for spare wheel winch construction wherein the same can be utilized for preventing the spare wheel winch from being lowered beneath the vehicle.

The general purpose of the present invention, which will be described subsequently in greater detail, is to provide a new security device for spare wheel winch which has many of the advantages of the spring-loaded and locking spare tire enforcer mentioned heretofore and many novel features that result in a new security device for spare wheel winch which is not anticipated, rendered obvious, suggested, or even implied by any of the prior art spring-loaded and locking spare tire enforcer, either alone or in any combination thereof.

To attain this, the present invention generally comprises a tubular member having a first open end and a second open end and also having a bore extending therethrough and further having a bracket-like portion disposed at the first end thereof; and also includes a locking assembly for preventing the spare wheel winch from being lowered.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new security device for spare wheel winch which has many of the advantages of the spring-loaded and locking spare tire enforcer mentioned heretofore and many novel features that result in a new security device for spare wheel winch which is not anticipated, rendered obvious, suggested, or even implied by any of the prior art spring-loaded and locking spare tire enforcer, either alone or in any combination thereof.

It is another object of the present invention to provide a new security device for spare wheel winch which may be easily and efficiently manufactured and marketed.

It is a further object of the present invention to provide a new security device for spare wheel winch which is of a durable and reliable construction.

An even further object of the present invention is to provide a new security device for spare wheel winch which is susceptible of a low cost of manufacture with regard to both materials and labor, and which accordingly is then susceptible of low prices of sale to the consuming public, thereby making such security device for spare wheel winch economically available to the buying public.

Still yet another object of the present invention is to provide a new security device for spare wheel winch which provides in the apparatuses and methods of the prior art some of the advantages thereof, while simultaneously overcoming some of the disadvantages normally associated therewith.

Still another object of the present invention is to provide a new security device for spare wheel winch for preventing the spare wheel winch from being lowered beneath the vehicle.

Yet another object of the present invention is to provide a new security device for spare wheel winch which includes a tubular member having a first open end and a second open end and also having a bore extending therethrough and further having a bracket-like portion disposed at the first end thereof; and also includes a locking assembly for preventing the spare wheel winch from being lowered.

Still yet another object of the present invention is to provide a new security device for spare wheel winch that is easy and convenient to use and install especially on sport utility vehicles.

Even still another object of the present invention is to provide a new security device for spare wheel winch that prevents the spare tire from being stolen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front end elevational view of a new security device for spare wheel winch according to the present invention.

FIG. 2 is a detailed front end elevational view of the lock member of the present invention.

FIG. 5 is a partial cross-sectional view of the elongate locking support member, the spring, and the shaft of the present invention.

FIG. 6 is a front end elevational view of the tab-like locking members being received in the diametrically-opposed slots of the tubular member of the present invention.

DESCRIPTION OF THE PREFERRED EMBODIMENT

Figure 3:
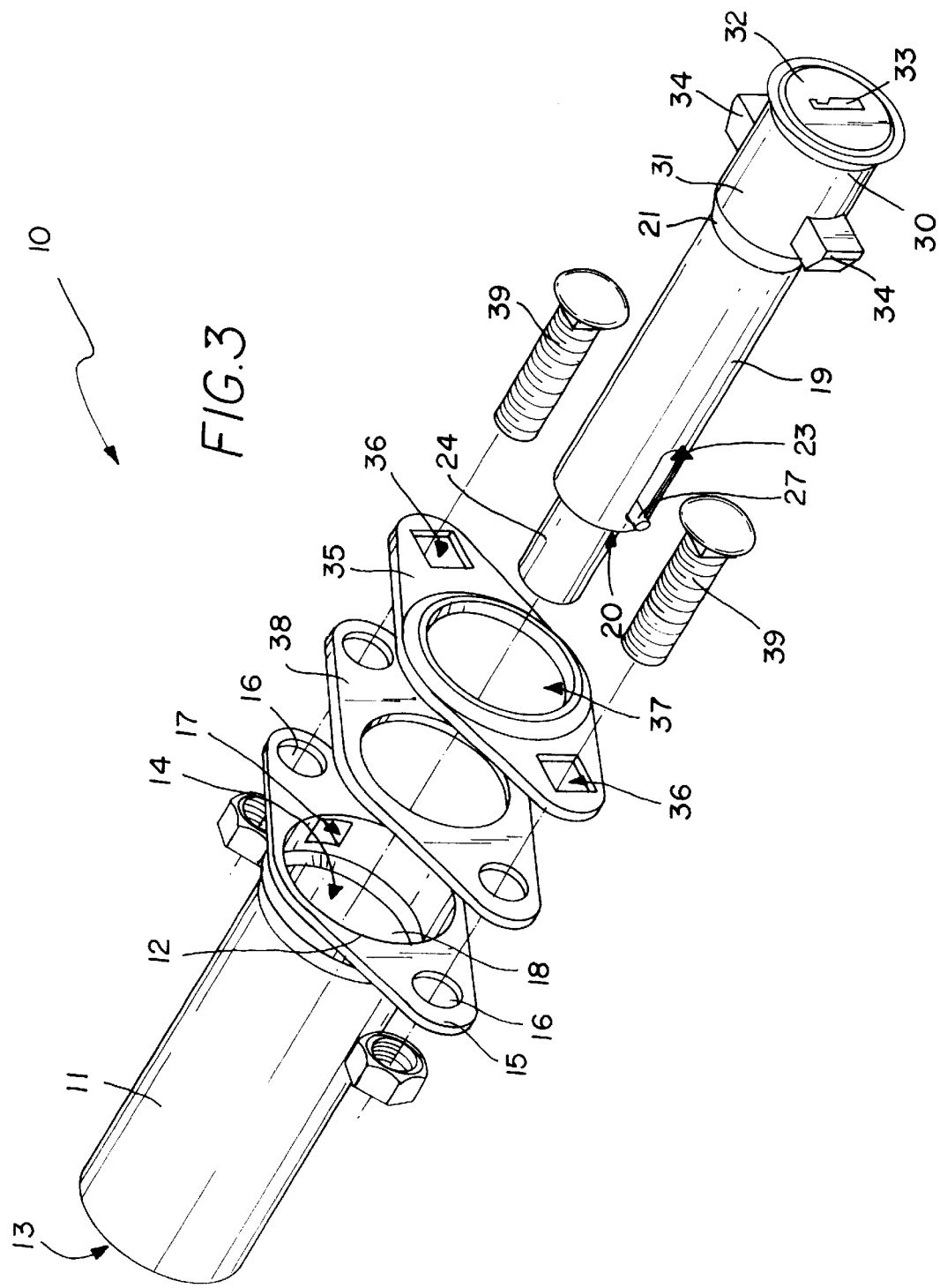
FIG. 3 is an exploded perspective view of the present invention.
Figure 4:
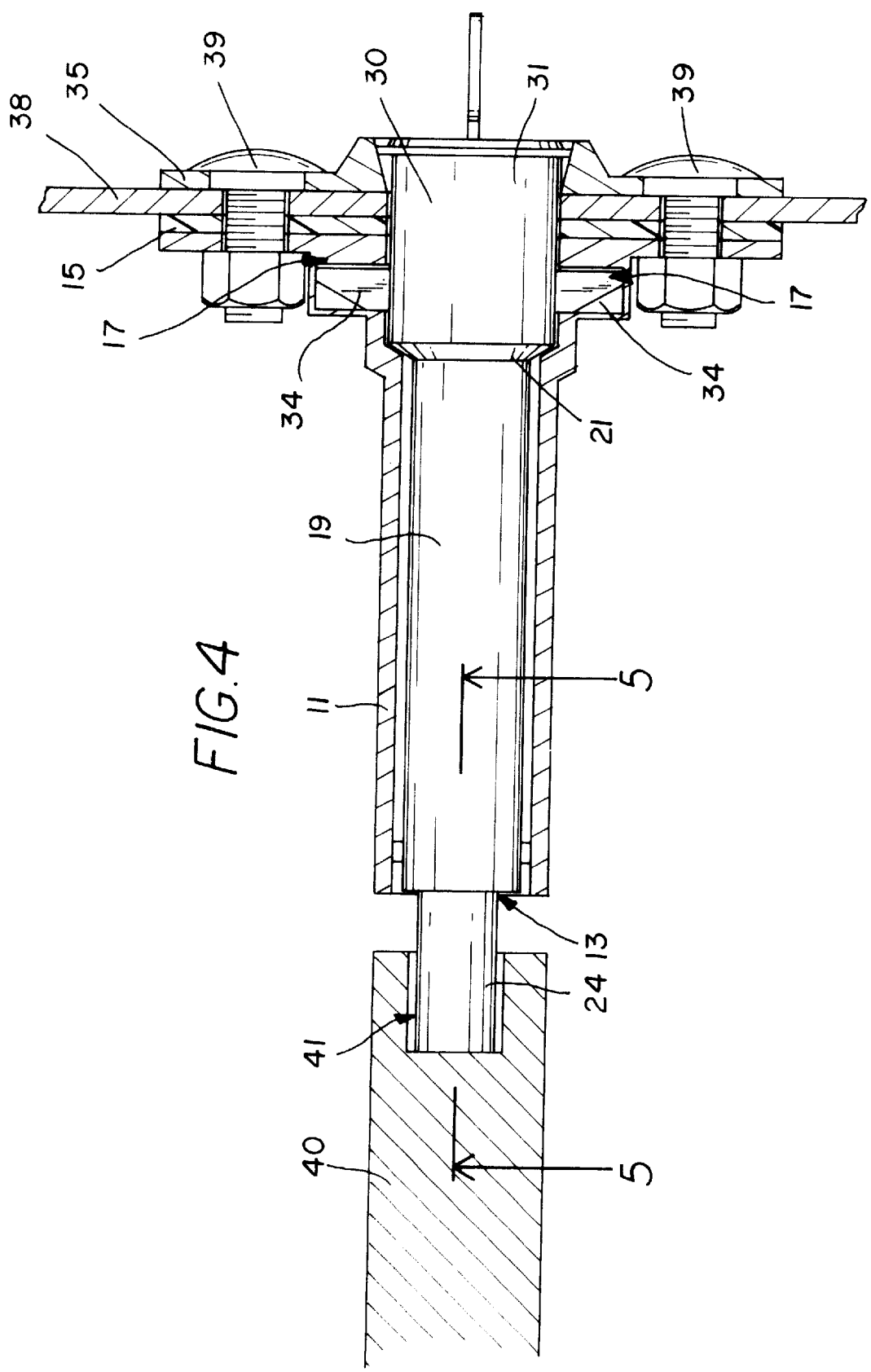
FIG. 4 is a side elevational view of the present invention shown in use.

With reference now to the drawings, and in particular to FIGS. 1 through 6 thereof, a new security device for spare wheel winch embodying the principles and concepts of the present invention and generally designated by the reference numeral 10 will be described.

As best illustrated in FIGS. 1 through 6, the security device for spare wheel winch 10 generally comprises a tubular member 11 having a first open end 12 and a second open end 13 and also having a bore 14 extending therethrough and further having a bracket-like portion 15 integrally disposed at the first end 12 thereof. The tubular member 11 includes diametrically-opposed slots 17 extending in a wall 18 forming the bore 14 near the first end 12 thereof. The bracket-like portion 15 includes mounting holes 16 disposed therethrough near ends thereof with the tubular member 11 having a length of approximately 6 inches.

A locking assembly for preventing the spare wheel winch 40 from being lowered includes an elongate locking support member 19 having an open first end 20, a second end 21, and a bore 22 extending therein, and being adapted to be removably disposed in the bore 14 of the tubular member 11, and also includes a tire lowering mechanism engaging member 24 movably disposed in and out of the bore 22 of the elongate locking support member 19 and being extendable through said second end 13 of said tubular member 11, and further includes a lock member 30 being securely and conventionally attached at the second end 21 of the locking support member 19, and also includes a spring 28 conventionally disposed in the bore 22 of the elongate locking support member 19 for biasing the tire lowering mechanism engaging member 24 outwardly of the elongate locking support member 19 with the spring 28 being supported by a spring support member 29 which is conventionally disposed in the bore 22 of the elongate locking support member 19. The elongate locking support member 19 includes diametrically-opposed longitudinal slots 23 extending through a wall thereof. The tire lowering mechanism engaging member 24 is essentially a shaft having a back end 25 and a recessed portion 26 extending in the back end 25 for receiving and supporting an end of the spring 28. The shaft 24 also has tab-like members 27 integrally extending outwardly of the shaft 24 and being movably extended through the longitudinal slots 23 of the elongate locking support member 19. The lock member 30 includes a housing 31 having a first end 32 and a key slot 33 extending in the first end 32, and also includes tab-like locking members 34 movably and conventionally disposed in a wall of the housing 31 and being biased outwardly of the housing 31 with the locking members 34 being removably received in the diametrically-opposed slots 17 of the tubular member 11 for locking the spare wheel winch 40 in a raised position beneath a vehicle.

A face plate 35 is fastened to the bracket-like portion 15 of the tubular member 11 with fasteners 39 with the face plate 35 having an opening 37 centrally disposed therethrough and also having mounting holes 36 disposed therethrough near ends thereof. A gasket member 38 is conventionally disposed between the face plate 35 and the bracket-like portion 15 to essentially prevent vibration of the face plate 35 and the bracket-like portion 15 of the tubular member 11.

In use, the user positions the tire lowering mechanism engaging member 24 in a hole 41 of the spare wheel winch 40 with the spring 28 essentially biasing the locking members 34 outwardly and into the diametrically-opposed slots 17 of the tubular member 11 to essentially prevent the spare wheel winch 40 from being lowered beneath the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A security device for a spare wheel winch comprising:
    a tubular member having a first open end and a second open end and also having a bore extending therethrough; and
    a locking assembly for preventing the spare wheel winch from being lowered;
    wherein said tubular member includes diametrically-opposed slots extending in a wall forming said bore;
    wherein said locking assembly includes:
        an elongate locking support member having an open first end, a second end, and a bore extending therein, said locking support member being extendable in said bore of said tubular member;
        a tire lowering mechanism engaging member movable into and out of said bore of said elongate locking support member and being extendable through said second end of said tubular member;
        a lock member attached at said second end of said locking support member;
        a spring disposed in said bore of said elongate locking support member for biasing said tire lowering mechanism engaging member outwardly of said elongate locking support member.

2. A security device for a spare wheel winch as described in claim 1, wherein said diametrically-opposed slots are positioned near said first end thereof.

3. A security device for a spare wheel winch as described in claim 1, wherein said tubular member includes a bracket portion disposed at the first end of said tubular member, and said bracket portion includes mounting holes disposed therethrough near ends of said bracket portion.

4. A security device for a spare wheel winch as described in claim 3, further including a face plate being fastened to said bracket portion of said tubular member with fasteners, and also includes a gasket member being disposed between said face plate and said bracket portion, said face plate having an opening centrally disposed therethrough and also having mounting holes disposed therethrough near ends thereof.

5. A security device for a spare wheel winch as described in claim 1, wherein said elongate locking support member includes diametrically-opposed longitudinal slots extending through a wall thereof.

6. A security device for a spare wheel winch as described in claim 1, wherein said tire lowering mechanism engaging member comprises a shaft having a back end and a recessed portion extending in said back end for receiving and supporting said spring, said shaft also having tab members integrally extending outwardly of said shaft and being movably extended through longitudinal slots formed in said elongate locking support member.

7. A security device for a spare wheel winch as described in claim 1, wherein said lock member includes:
    a housing having a first end and a key slot extending in said first end; and
    locking members movably disposed in a wall of said housing and being biased outwardly of said housing, said locking members being removably received in said diametrically-opposed slots of said tubular member for locking the spare wheel winch in a raised position beneath a vehicle.

8. A security device for a spare wheel winch comprising:
    tubular member having a first open end and a second open end and also having a bore extending therethrough and further having a bracket-like portion disposed at said first end thereof; and
    a locking assembly for preventing the spare wheel winch from being lowered;
    wherein said tubular member includes diametrically-opposed slots extending in a wall forming said bore near said first end thereof; and
    wherein said bracket-like portion includes mounting holes disposed therethrough near ends thereof;
    wherein said locking assembly includes an elongate locking support member having an open first end, a second end, and a bore extending therein and being extendable in said bore of said tubular member, and also includes a tire lowering mechanism engaging member movably disposed in and out of said bore of said elongate locking support member and being extendable through said second end of said tubular member, and further includes a lock member being securely attached at said second end of said locking support member, and also includes a spring disposed in said bore of said elongate locking support member for biasing said tire lowering mechanism engaging member outwardly of said elongate locking support member with said spring being supported by a spring support member.

9. A security device for a spare wheel winch as described in claim 8, wherein said elongate locking support member includes diametrically-opposed longitudinal slots extending through a wall thereof.

10. A security device for a spare wheel winch as described in claim 8, wherein said tire lowering mechanism engaging member comprises a shaft having a back end and a recessed portion extending in said back end for receiving and supporting said spring, said shaft also having tab-like members integrally extending outwardly of said shaft and being movably extended through longitudinal slots formed in said elongate locking support member.

11. A security device for a spare wheel winch as described in claim 8, wherein said lock member includes a housing having a first end and a key slot extending in said first end, and also includes locking members movably disposed in a wall of said housing and being biased outwardly of said housing, said locking members being removably received in said diametrically-opposed slots of said tubular member for locking the spare wheel winch in a raised position beneath a vehicle.

12. A security device for a spare wheel winch as described in claim 8, further includes a face plate being fastened to said bracket-like portion of said tubular member with fasteners, and also includes a gasket member being disposed between said face plate and said bracket-like portion, said face plate having an opening centrally disposed therethrough and also having mounting holes disposed therethrough near ends thereof.

13. A security device for a spare wheel winch comprising:
    a tubular member having a first open end and a second open end and also having a bore extending therethrough and further having a bracket-like portion disposed at said first end thereof, said tubular member including diametrically-opposed slots extending in a wall forming said bore near said first end thereof, said bracket-like portion including mounting holes disposed therethrough near ends thereof, said tubular member having a length of approximately 6 inches; and a locking assembly for preventing the spare wheel winch from being lowered including an elongate locking support member having an open first end, a second end, and a bore extending therein, and also including a tire lowering mechanism engaging member movably disposed in and out of said bore of said elongate locking support member, and further including a lock member being securely attached at said second end of said locking support member, and also including a spring disposed in said bore of said elongate locking support member for biasing said tire lowering mechanism engaging member outwardly of said elongate locking support member with said spring being supported upon a spring support member, said elongate locking support member including diametrically-opposed longitudinal slots extending through a wall thereof, said tire lowering mechanism engaging member being essentially a shaft having a back end and a recessed portion extending in said back end for receiving supporting an end of said spring, said shaft also having tab-like members integrally extending outwardly of said shaft and being movably extended through said longitudinal slots of said elongate locking support member, said lock member including a housing having a first end and a key slot extending in said first end, and also including locking members movably disposed in a wall of said housing and being biased outwardly of said housing, said locking members being removably received in said diametrically-opposed slots of said tubular member for locking the spare wheel winch in a raised position beneath a vehicle;

a face plate being fastened to said bracket-like portion of said tubular member with fasteners, said face plate having an opening centrally disposed therethrough and also having mounting holes disposed therethrough near ends thereof; and a gasket member being disposed between said face plate and said bracket-like portion.

\* \* \* \* \*